US007260281B2

(12) United States Patent
Salib et al.

(10) Patent No.: US 7,260,281 B2
(45) Date of Patent: Aug. 21, 2007

(54) INTEGRATABLE OPTICAL ISOLATOR IN A MACH-ZEHNDER INTERFEROMETER CONFIGURATION

(75) Inventors: Michael S. Salib, Campbell, CA (US); Dmitri E. Nikonov, Morgan Hill, CA (US)

(73) Assignee: Intel Corporation, Santa Clara, CA (US)

( * ) Notice: Subject to any disclaimer, the term of this patent is extended or adjusted under 35 U.S.C. 154(b) by 93 days.

(21) Appl. No.: 11/095,264

(22) Filed: Mar. 30, 2005

(65) Prior Publication Data

US 2006/0222282 A1  Oct. 5, 2006

(51) Int. Cl.
*G02B 6/00* (2006.01)
*G02B 5/30* (2006.01)
*G02B 27/28* (2006.01)

(52) U.S. Cl. .................. 385/11; 359/494; 359/495; 359/497

(58) Field of Classification Search ................ 359/494, 359/495, 497; 385/11, 39
See application file for complete search history.

(56) References Cited

U.S. PATENT DOCUMENTS

| 5,400,418 | A | 3/1995 | Pearson et al. ............... 385/11 |
| 6,175,668 | B1 | 1/2001 | Borrelli et al. ............... 385/11 |
| 6,434,289 | B1 | 8/2002 | Paniccia et al. ............... 385/16 |
| 6,535,656 | B1 * | 3/2003 | Noge et al. ................... 385/11 |
| 6,690,036 | B2 | 2/2004 | Morse et al. .................. 257/82 |
| 6,757,451 | B2 | 6/2004 | Chang et al. ................. 385/11 |
| 6,947,619 | B2 * | 9/2005 | Fujita et al. .................. 385/11 |
| 7,043,100 | B2 | 5/2006 | Fujita et al. .................. 385/11 |
| 2002/0173058 | A1 | 11/2002 | Liu et al. ...................... 438/16 |
| 2003/0113053 | A1 | 6/2003 | Kuramata ..................... 385/14 |
| 2003/0198438 | A1 | 10/2003 | Wang et al. ................... 385/39 |
| 2003/0223694 | A1 | 12/2003 | Nikonov et al. ............... 389/39 |
| 2004/0141677 | A1 | 7/2004 | Hanashima et al. ........... 385/14 |
| 2004/0179256 | A1 | 9/2004 | Hammer ..................... 359/248 |

FOREIGN PATENT DOCUMENTS

EP          793130 A       9/1997

(Continued)

OTHER PUBLICATIONS

Liu, P. et al., "Study of Form Birefringence in Waveguide Devices Using the Semivectorial Beam Propagation Method," IEEE Photonics Technology Letters, vol. 3, No. 10, (Oct. 1991), pp. 913-915.

(Continued)

*Primary Examiner*—Sung Pak
*Assistant Examiner*—Daniel Petkovsek
(74) *Attorney, Agent, or Firm*—Blakely, Sokoloff, Taylor & Zafman LLP (57) ABSTRACT

An optical isolator includes first and second optical splitter-combiners disposed within a semiconductor die. The optical splitter-combiners are coupled together into an interferometer configuration by first and second waveguide sections also disposed in the semiconductor die. A non-reciprocal optical phase shift element is disposed within the semiconductor die and includes the first waveguide section passing through the non-reciprocal optical phase shift element. The optical isolator is configured such that forward propagating waves are constructively recombined by the second optical splitter-combiner while reverse propagating wave are destructively recombined by the first optical splitter-combiner.

12 Claims, 10 Drawing Sheets

FOREIGN PATENT DOCUMENTS

| EP | 1227359 A | 7/2002 |
|---|---|---|
| JP | 10-239637 | 9/1998 |
| JP | 2002-277826 | 9/2002 |
| WO | WO 2004-061494 A | 7/2004 |

OTHER PUBLICATIONS

Zhuromsky, O. et al., "Polarization Independent Mach-Zehnder-Type Integrated Optical Isolator," Journal of Lightwave Technology, vol. 17, No. 7, (Jul. 1999), pp. 1200-1205.

Izuhara, T. et al., "Direct wafer bonding and transfer of 10-μm-thick magnetic garnet films onto semiconductor surfaces," Applied Physics Letters, vol. 76, No. 10, (Mar. 6, 2000), pp. 1261-1263.

Fujita, J. et al., "Waveguide optical isolator based on Mach-Zehnder interferometer," Applied Physics Letters, vol. 76, No. 16, (Apr. 17, 2000), pp. 2158-2160.

den Bensten, J.H. et al., "Simulation and Design of a 40 GHz Mach-Zehnder Modulator on InP," Proceedings Symposium IEEE/LEOS Benelux Chapter, 2002, Amsterdam, pp. 123-126.

Salib, M. et al., "Integratable Polarization Rotator," U.S. Appl. No. 10/963,313, filed Oct. 11, 2004.

McDonald, M. et al., "Semi-Integrated Designs with In-Waveguide Mirrors for External Cavity Tunable Lasers," U.S. Appl. No. 11/023,711, filed on Dec. 28, 2004.

Fujita, J. et al., "Polarization-Independent Waveguide Optical Isolator Based on Nonreciprocal Phase Shift", IEEE Photonics Technology Letters, vol. 12, No. 11, Nov. 2000, pp. 1510-1512.

Okamura, Y. et al., "Integrated optical isolator and circulator using nonreciprocal phase shifters: a proposal", Applied Optics, vol. 23, No. 11, Jun. 1, 1984, pp. 1886-1889.

Fujita, J. et al., "Waveguide optical isolator based on Mach-Zehnder interferometer", Applied Physics Letters, vol. 76, No. 16, Apr. 17, 2000, pp. 2158-2160.

Mizumoto, T. et al., "In-Plane Magnetized Rare Earth Iron Garnet for a Waveguide Optical Isolator Employing Nonreciprocal Phase Shift", IEEE Transactions on Magnetics, vol. 29, No. 6, Nov. 1993, pp. 3417-3419.

PCT/US2006/012996, PCT International Search Report and Written Opinion of the International Searching Authority, Aug. 1, 2006.

Izuhara, T. et al., "Integration of Magnetooptical Waveguides Onto a III-V Semiconductor Surface" IEEE Photonics Technology Letters, vol. 14, No. 2, (Feb. 2002), pp. 167-169.

"Gallium Gadolinium Garnet, Gd3Ga5O12," Alomaz Optics, Inc. Retrieved from http://www.almazoptics.com/GGG.html on Oct. 26, 2006.

"Gallium Gadolinium Garnet," from Wikipedia, the free encyclopedia. Retrieved from http://en.wikipedia.org/wiki/Gallium_Gadolinium_Garnet on Oct. 26, 2006.

"Gallium Gadolinium Garnet," Marubeni Specialty Chemicals, Inc. Retrieved from http://www.msi-us.net/productdetail.cfm?id=265 on Oct. 26, 2006.

Jonker, B.T., "Progress Toward Electrical Injection of Spin Polarized Electrons into Semiconductors," Proceeding of the IEEE, vol. 91, No. 91, May 2003, pp. 727-740.

U.S. Appl. No. 11/096,040, filed Mar. 30, 2005, Non-Final Office Action dated Aug. 25, 2006.

Final Office Action mailed on Jan. 8, 2007, U.S. Appl. No. 11/096,040, filed on Mar. 30, 2005, Salib et al.

\* cited by examiner

FIG. 9

INTEGRATABLE OPTICAL ISOLATOR IN A MACH-ZEHNDER INTERFEROMETER CONFIGURATION

TECHNICAL FIELD

This disclosure relates generally to optical isolators, and in particular but not exclusively, relates to integratable optical isolator using a polarization phase shifter.

BACKGROUND INFORMATION

Optical communication systems may be used as high-bandwidth interconnects between electronic based processing systems. A signal is converted from the electrical realm to the optical realm on a transmitter side, launched into a transmissive medium (e.g., optical fiber), and then converted back to the electrical realm on a receiver side.

A number of photonic devices may be coupled with the transmissive medium between the transmitter side and the receiver side for manipulating the optical signal in a variety of manners, such as focusing, repeating/amplifying, routing, splitting, encoding/encrypting, and the like. Since propagation of an optical wave through a transmissive medium or photonic device is usually bi-directional (i.e., an optical wave can propagation in the forward and backward direction), these photonic devices can causes backward propagating reflections due to, for example, mismatches in an index of refraction at the interfaces of these photonic devices. If not blocked, these backward propagating reflections can disturb the operation of the optical communication system. A backward propagating reflection that enters the laser source on the transmitter side can interfere with stimulation emission within a resonance cavity of the laser source, and thereby cause unwanted noise limiting the performance of the optical communication system.

Optical isolators are often inserted inline between a laser source and a transmissive medium to block backward propagating reflections from entering the resonance cavity. Currently, optical isolators are standalone devices coupled to the output of an optical source via an optical fiber. Known standalone optical isolators include discrete, nonintegrated components such as a polarizer and a birefringent crystal rotator.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an integratable optical isolator are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
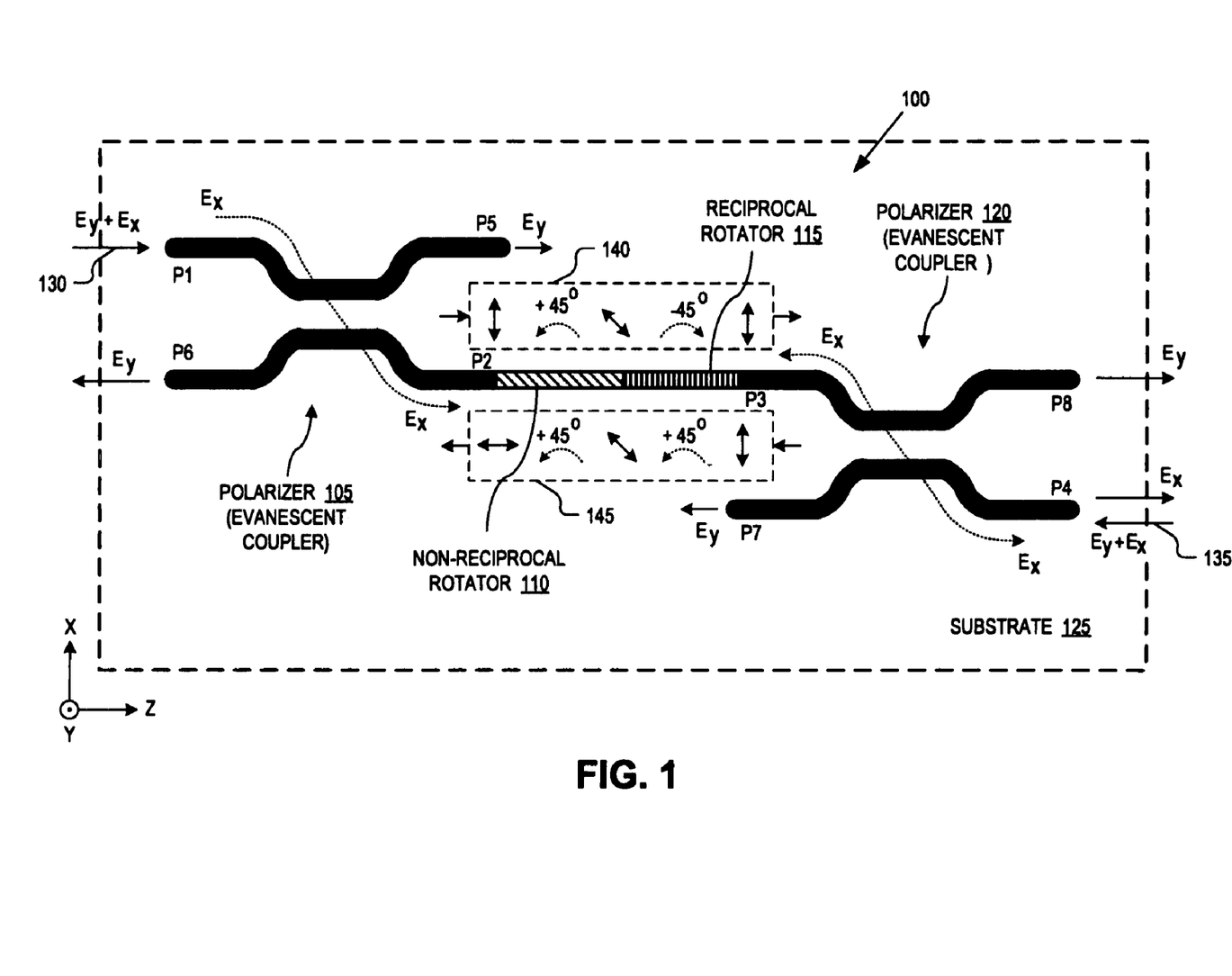
FIG. 1 is a schematic diagram illustrating a plan view of an optical isolator, in accordance with an embodiment of the invention.

FIG. 1 is a schematic diagram illustrating a plan view of an optical isolator 100, in accordance with an embodiment of the invention. The illustrated embodiment of optical isolator 100 includes a first polarizer 105, a non-reciprocal rotator 110, a reciprocal rotator 115, and a second polarizer 120 all integrated within a single substrate 125. In one embodiment, substrate 125 is a multi-layer semiconductor die having the components of optical isolator 100 monolithically integrated therein.

FIG. 1 illustrates the forward direction of propagation as being left to right with polarizer 105 as an input polarizer and polarizer 120 as the output polarizer. By convention, an output polarizer (e.g., polarizer 120 as illustrated) is often referred to as an "analyzer." However, it should be appreciated that some embodiments of the invention include polarizers 105 and 120 as structurally indistinguishable and further that optical isolator 100 may be configured to operate with the direction of forward propagating being right to left, such that polarizer 120 is the input polarizer and polarizer 105 is the analyzer.

The components of optical isolator 100 are interconnected as follows. Polarizer 105 includes a port P1 coupled to receive a forward propagating wave 130 and a port P2 coupled to output a portion of forward propagating wave 130. Port P2 is coupled to a first side of non-reciprocal rotator 110. A second side of non-reciprocal rotator 110 is coupled to a first side of reciprocal rotator 115. A second side of reciprocal rotator 115 is coupled to a port P3 of polarizer 120. Finally, a port P4 of polarizer 120 is coupled to output a portion of forward propagating wave 130 to a waveguide or other optical devices internally integrated within substrate 125 or externally coupled thereto.

Optical isolator 100 prevents backward propagating waves 135 from reaching port P1 of polarizer 105, thereby providing optical isolation in the backward propagation direction. In effect, optical isolator 100 is a one way optical link. Backward propagating waves 135 may arise from noise within an optical communication system coupled downstream from optical isolator 100. In particular, backward propagating waves 135 may result from reflections of forward propagating wave 130. Portions of forward propagating wave 130 may reflect due to the coupling of photonic devices to downstream optical media guiding forward propagating wave 130. The interface of various photonic devices may cause mismatches in the effective index of refraction within the communication media, which in turn cause detrimental reflections, such as backward propagating waves 135.

The components of optical isolator 100 operate as follows. Forward propagating wave 130 may include portions having a horizontal plane of polarization (Ex) and a vertical plane of polarization (Ey) of an electric field ("E-field"). Polarizer 105 acts to substantially pass the entire Ex portion to port P2, while guiding substantially the entire Ey portion to port P5. As the Ex portion of forward propagating wave 130 passes through non-reciprocal rotator 110, the polarization of forward propagating wave 130 is rotated by +45 degrees to the x-axis (See forward propagating rotation diagram 140. Note, since FIG. 1 is a two dimensional view of optical isolator 100 in the X-Z plane, it is not possible to illustrate polarization rotations in the X-Y plane. Accordingly, the polarization planes are illustrated as rotating in the X-Z plane merely for illustration and are not intended to be an accurate portrayal of E-field rotations in the X-Y plane). As forward propagating wave 130 propagates through reciprocal rotator 115, the E-field of forward propagating wave 130 is rotated by −45 degrees to the x-axis to return the plane of polarization back to the Ex plane. Subsequently, polarizer 120 is configured to pass waves having the Ex plane of polarization received at port P3 through to port P4, where forward propagating wave 130 is output. Any residual Ey portions of forward propagating wave 130 received at port P3 of polarizer 120 are guided to port P8, and therefore separated from the Ex portions.

Backward propagating waves 135 may also include both Ex and Ey portions, although the majority of backward propagating waves 135 will be back reflections of forward propagating wave 130, and therefore have the Ex plane of polarization. Backward propagating waves 135 received at port P4 of polarizer 120 are polarized into two portions. The Ex portions are substantially passed to port P3, while the Ey portions are substantially passed to port P7. As the Ex portion of backward propagating waves 135 passes through reciprocal rotator 115, the plane of polarization of the E-field is rotated by +45 degrees from the x-axis (see backward propagating rotation diagram 145). As backward propagating wave 135 passes through non-reciprocal rotator 110, the E-field is again rotated by another +45 degrees to the x-axis, resulting in the E-field now being polarized in the vertical plane of polarization or Ey. Subsequently, polarizer 105 guides backward propagating wave 135 having an Ey plane of polarization to port P6, leaving port P1 free of detrimental reflections or backward propagating waves 135.

In an alternative embodiment, the position of non-reciprocal rotator 110 and reciprocal rotator 115 may be swapped such that reciprocal rotator 115 is coupled to polarizer 105 and non-reciprocal rotator 110 is coupled to polarizer 120. Furthermore, in an alternative embodiment, non-reciprocal rotator 110 may be configured to rotate both forward and backward propagating waves 130 and 135 by −45 degrees to the x-axis, while reciprocal rotator 115 is configured to rotate forward propagating waves 130 by +45 degrees to the x-axis and backward propagating waves 135 by −45 degrees to the x-axis. Although optical isolator 100 is illustrated as selectively passing Ex polarized forward propagating waves 130 while blocking Ex polarized backward propagating waves 135, as will be discussed below, optical isolator 100 may be modified to selectively pass Ey forward propagating waves 130 while blocking Ey backward propagating waves 135.

Figure 2A:
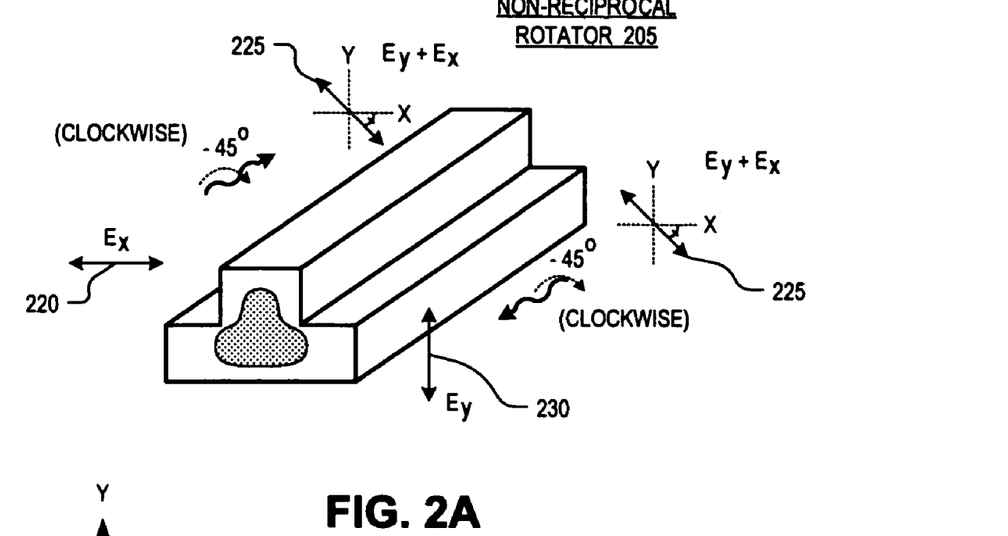
FIG. 2A illustrates a perspective view of a generic non-reciprocal rotator, in accordance with an embodiment of the invention.
Figure 2B:
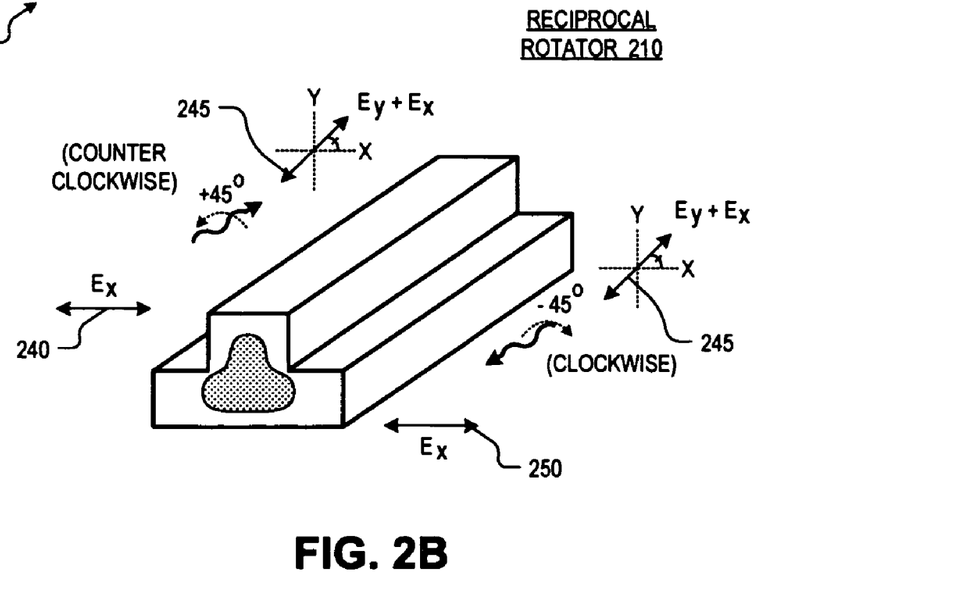
FIG. 2B illustrates a perspective view of a generic reciprocal rotator, in accordance with an embodiment of the invention.

FIG. 2A illustrates a perspective view of generic non-reciprocal rotator 205, while FIG. 2B illustrates a perspective view of a generic reciprocal rotator 210. Although FIGS. 2A and 2B illustrate generic rotators 205 and 210 embodied within rib waveguides, other waveguide configurations (e.g., planar, rectangular, square, circular, oval, and the like) and rotator structures may be used to implement generic non-reciprocal rotator 205 and generic reciprocal rotator 210.

As illustrated in FIG. 2A, a non-reciprocal rotator is a rotator that, in a fixed coordinate system 215, induces either a clockwise rotation (illustrated) of an E-field in both directions of propagation or a counterclockwise rotation (not illustrated) of the E-field in both directions of propagation. For example, when a wave having a linear Ex polarization 220 is propagated through generic non-reciprocal rotator 205 along the positive z-axis, it is rotated by −45 degrees to the x-axis resulting in a linearly hybrid Ex+Ey polarization 225. When the hybrid Ex+Ey polarization 225 is propagated back through generic non-reciprocal rotator 205 along the negative z-axis, in the stationary coordinates 215, generic non-reciprocal rotator 205 again rotates the E-field by −45 degrees to the x-axis (clockwise) resulting in a linear Ey polarization 230. Accordingly, generic non-reciprocal rotator 205 does not return a wave to its original plane of polarization when propagated in one direction and back out the other direction. It should be appreciated that a rotation of 45 degrees below the x-axis (or π/4 radians clockwise about the z-axis) is selected merely for illustration and that generic non-reciprocal rotator 205 may be configured to induce other rotation angles, either clockwise or counterclockwise.

As illustrated in FIG. 2B, a reciprocal rotator is a rotator that, in the fixed coordinate system 215, induces a clockwise rotation of an E-field in one direction and a counterclockwise rotation in the other. For example, when a wave having a linear Ex polarization 240 is propagated through generic reciprocal rotator 210 along the positive z-axis, it is rotated by +45 degrees to the x-axis (counterclockwise) resulting in a linearly hybrid Ex+Ey polarization 245. When the hybrid Ex+Ey polarization 245 is propagated back through generic reciprocal rotator 210 along the negative z-axis, in the stationary coordinates 215, generic reciprocal rotator 210 rotates the E-field by −45 degrees to the x-axis (clockwise), returning the E-field to a linear Ex polarization 250. Accordingly, generic non-reciprocal rotator 210 does return a wave to its original plane of polarization when propagated in one direction and back out the other direction. It should be appreciated that the direction and amount of rotation for forward or backward propagation may be selected based on geometries of generic reciprocal rotator 210.

Figure 3A:
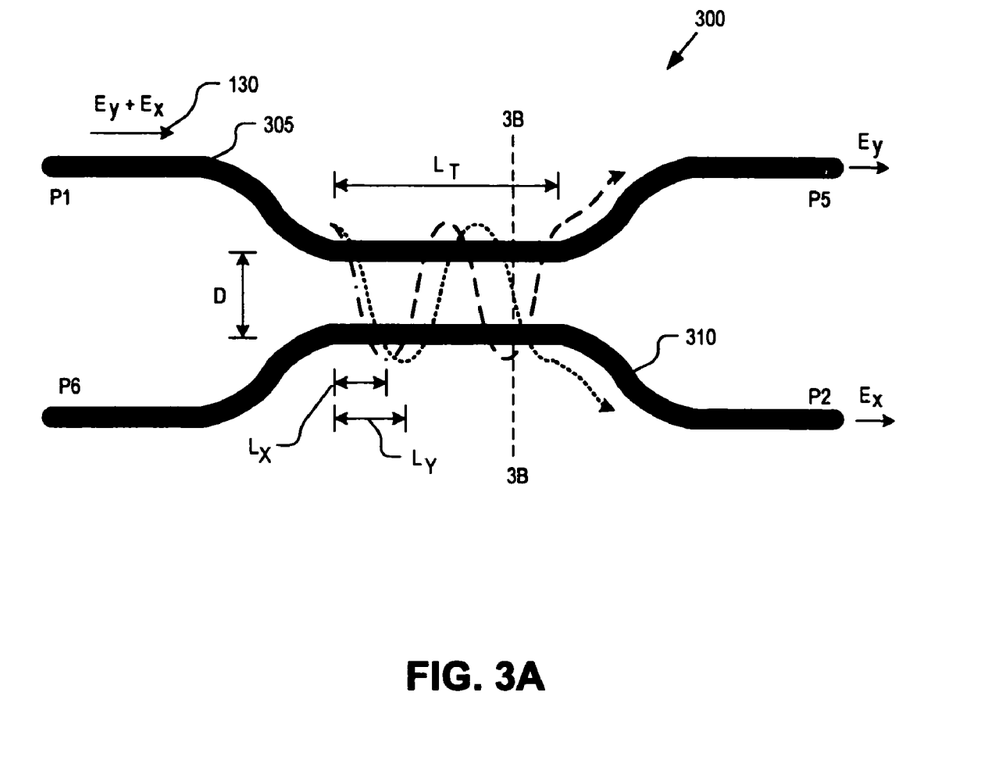
FIG. 3A is a schematic diagram illustrating a plan view of an evanescent coupler configured as a polarizer/analyzer, in accordance with an embodiment of the invention.
Figure 3B:
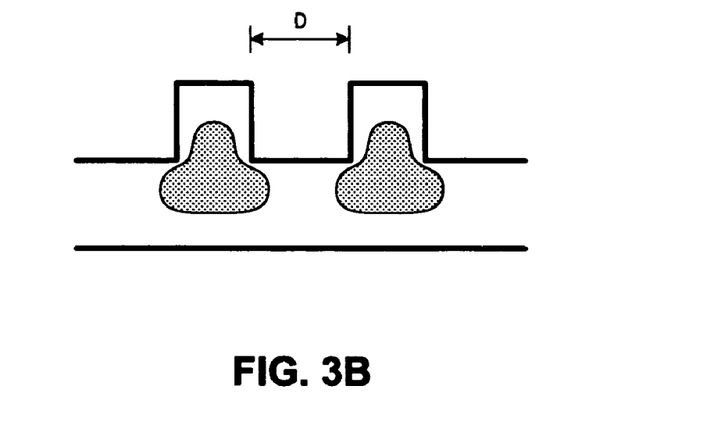
FIG. 3B is a schematic diagram illustrating a cross sectional view of an evanescent coupler configured as a polarizer/analyzer, in accordance with an embodiment of the invention.

FIG. 3A is a schematic diagram illustrating a plan view of an evanescent coupler 300 configured as one of polarizers (or analyzers) 105 or 120, in accordance with an embodiment of the invention. FIG. 3B is a schematic diagram illustrating a cross sectional view of evanescent coupler 300 along cross section 3B-3B in FIG. 3A. The illustrated embodiment of evanescent coupler 300 includes a first waveguide section 305 and a second waveguide section 310, routed to run parallel to one another over a total interaction length $L_T$.

As an optical wave is propagated through one of waveguide sections 305 and 310, the E-field of the optical wave evanescently couples back-and-forth between the two waveguide sections. The interaction length needed to substantially couple all the optical energy from one waveguide section to the next is dependent upon, the wavelength of the optical wave $\lambda$, the separation distance D, and the orientation of the polarization of the E-field. Accordingly, an optical wave, such as forward propagating wave 130, having Ex and Ey polarization components, will have a coupling length $L_X$ for the Ex polarization components and a coupling length $L_Y$ for the Ey polarization components. By selectively setting the total interaction length $L_T$ to be an odd multiple of $L_X$, the Ex components will couple back-and-forth an odd number of times resulting in the Ex components being routed to port P2. By selectively setting the total interaction length $L_T$ to be an even multiple of $L_Y$, the Ey components will couple back-and-forth an even number of times resulting in the Ey components being routed to port P5. Accordingly, in one embodiment, $L_T$, $L_X$, and $L_Y$ may be related according to relation 1 below.

$$L_T = 3L_X = 4L_Y \quad \text{(Relation 1)}$$

In one embodiment, for $\lambda=1.55$ μm, D=4.25 μm, and $L_X=2.5$ mm. It should be appreciated that evanescent coupler 300 can be modified to pass Ey components to port P2 and Ex components to port P5, by fabricating the evanescent coupler 300 such that $L_T$ is substantially an even multiple of $L_X$ and an odd multiple of $L_Y$.

Figure 3C:
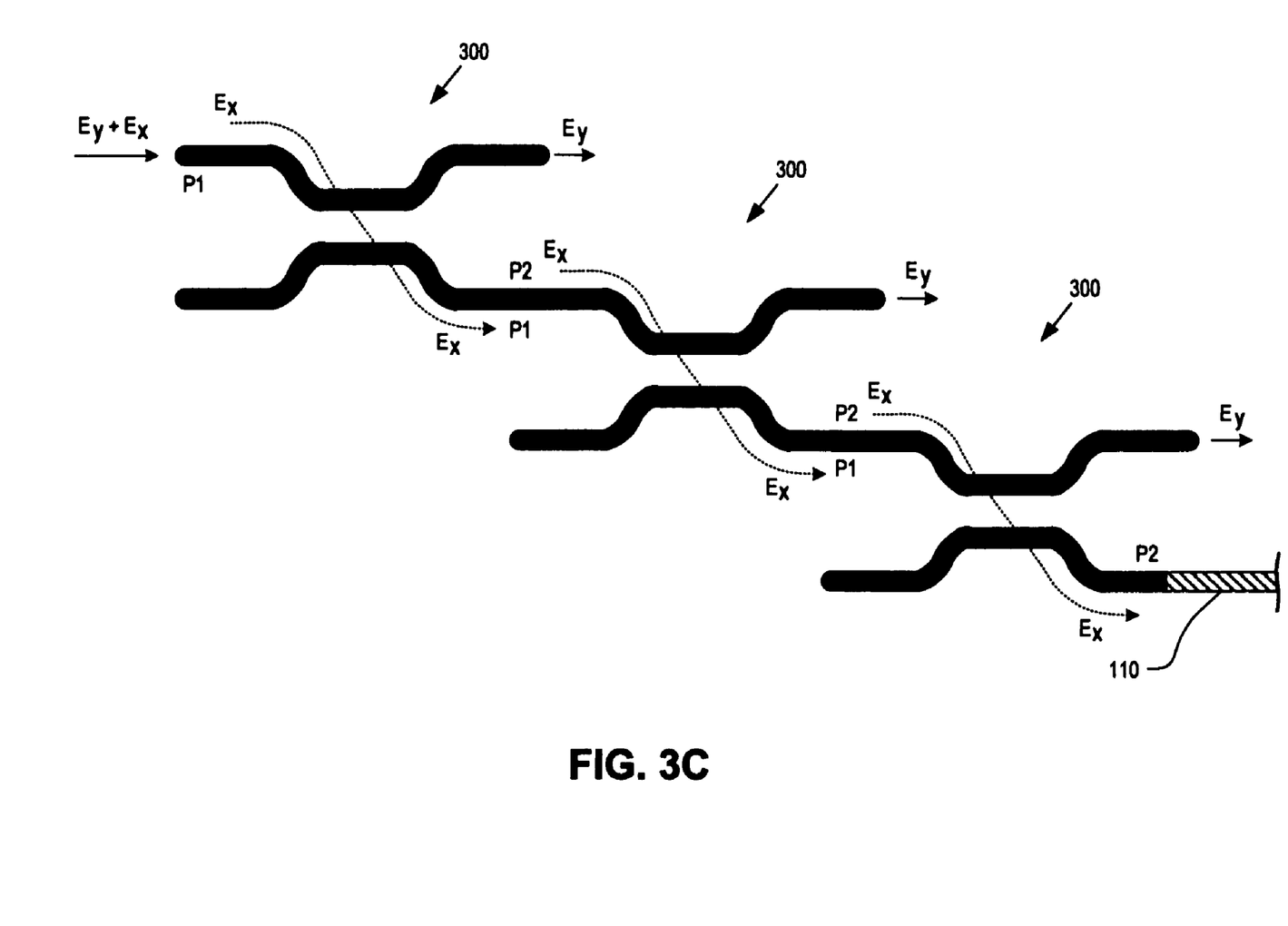
FIG. 3C is a schematic diagram illustrating a plan view of multiple evanescent couplers coupled in series to provide greater polarization isolation, in accordance with an embodiment of the invention.

FIG. 3C is a schematic diagram illustrating a plan view of multiple evanescent couplers 300 coupled in series to provide greater polarization isolation, in accordance with an embodiment of the invention. By linking multiple evanescent couplers 300 in series, such that port P2 of a left evanescent coupler is coupled to port P1 of a right evanescent coupler, the degree of separation between the Ex and Ey planes of polarization is increased. Increased Ex and Ey separation results in greater suppression of backward propagating waves 135.

Figure 4:
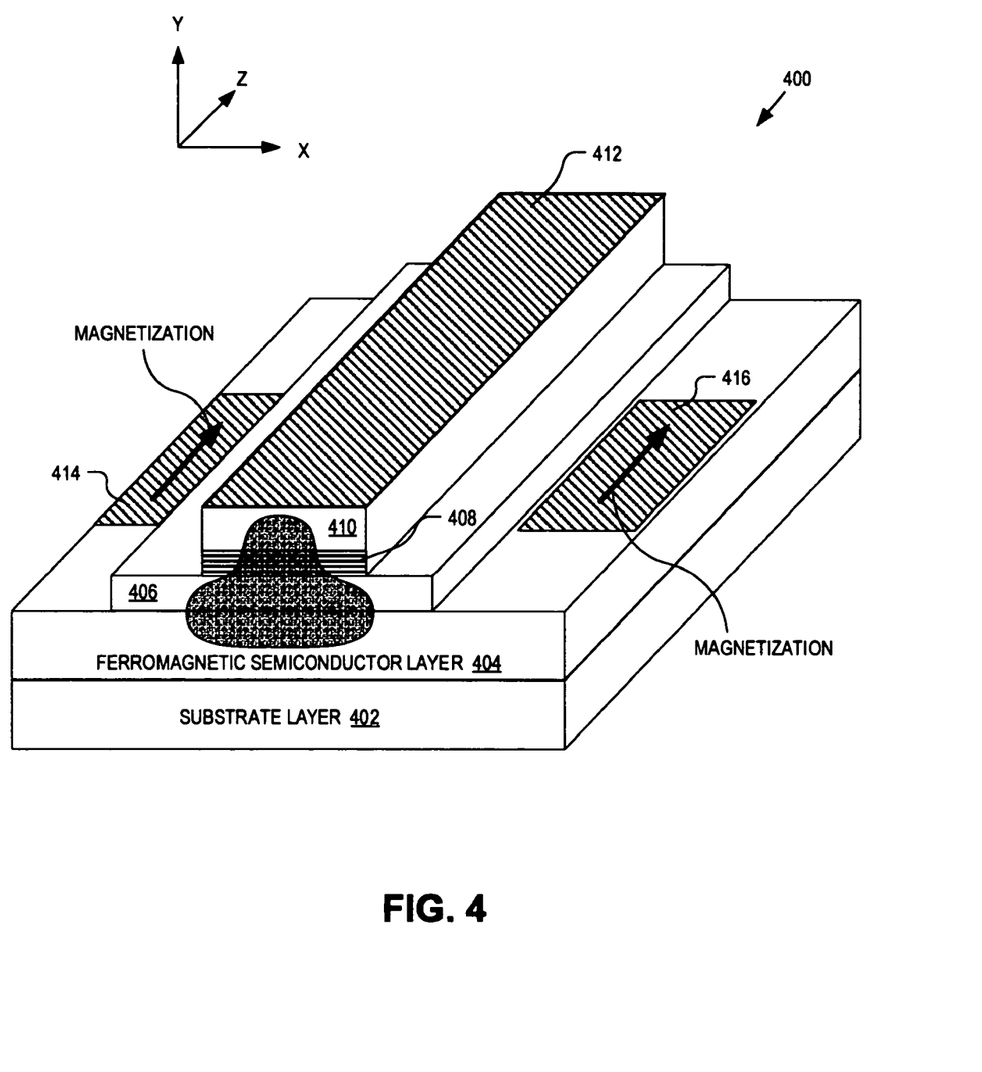
FIG. 4 illustrates a perspective view of a non-reciprocal polarization rotator, in accordance with an embodiment of the invention.

FIG. 4 illustrates a perspective view of a polarization rotator 400, in accordance with an embodiment of the invention. Polarization rotator 400 is one possible embodiment of non-reciprocal rotator 110. Polarization rotator 400 may be integrated with other passive or active devices or structures on a substrate layer 402, or may be a discrete device. Substrate layer 402 may comprise a piece of material, such as a piece of silicon or other material. Substrate layer 402 may be a physical structure, a layer that is a basic workpiece transformed and/or added to by various processes into the desired microelectronic configuration, or another material or materials. Substrate layer 402 may include conducting material, insulating material, semiconducting material, and other materials or material combinations. In some embodiments, substrate layer 402 may be a multi-layered structure (e.g., substrate 125).

There may be a ferromagnetic semiconductor layer 404 on substrate layer 402. Ferromagnetic semiconductor layer 404 may be a layer of semiconducting material that becomes magnetized in the presence of a magnetic field and retains its magnetism even when the field is removed. In a first embodiment, ferromagnetic semiconductor layer 404 may comprise manganese, silicon, and germanium. In a second embodiment, ferromagnetic semiconductor layer 404 may comprise manganese, gallium, and arsenic. In other embodiments, ferromagnetic semiconductor layer 404 may comprise other materials.

There may be a first doped semiconductor layer 406 on ferromagnetic semiconductor layer 404. In the first embodiment, first doped layer 406 may comprise silicon and germanium. In the second embodiment, first doped layer 406 may comprise aluminum, gallium and arsenic. In other embodiments, first doped layer 406 may comprise other materials. First doped layer 406 may be doped to a polarity compatible with ferromagnetic semiconductor layer 404. For example, in an embodiment where ferromagnetic semiconductor layer 404 comprises manganese, gallium, and arsenic, or silicon and germanium, the first doped layer 406 may be p-doped. In other embodiments, first doped layer 406 may be n-doped.

There may be a heterostructure 408 on first doped layer 406. Heterostructure 408 may comprise a plurality of alternating thin layers of materials: a layer comprising a first material or set of materials alternating with a layer comprising a second material or set of materials. The layering forms one or more heterojunctions. Thus, heterostructure 408 may form a quantum well or other type of heterostructure 408 that may confine carriers in the vertical direction Y of FIG. 4. This confinement may enhance polarization of the material, which affects the light traveling in the propagation direction Z through polarization rotator 400. (Note that the term "light" as used herein encompasses any appropriate type of electromagnetic wave, such as forward and reverse propagating waves 130 and 135.) In a first embodiment, heterostructure 408 may comprise one or more layers comprising silicon alternating with one or more layers comprising silicon and germanium. In a second embodiment, heterostructure 408 may comprise one or more layers comprising gallium and arsenic alternating with one or more layers comprising aluminum, oxygen, gallium, and arsenic. In other embodiments, the alternating layers may comprise other materials.

There may be a second doped layer 410 on heterostructure 208. In a first embodiment, second doped layer 410 may comprise silicon. In a second embodiment, second doped layer 410 may comprise aluminum, gallium and arsenic. In other embodiments, second doped layer 410 may comprise other materials. Second doped layer 410 may be doped to a polarity opposite that of first doped layer 206. For example, in an embodiment where first doped layer 406 is p-doped, second doped layer 410 may be n-doped. In an embodiment where first doped layer 406 is n-doped, second doped layer 410 may be p-doped. This arrangement of polarity of dopants results in a diode structure that may promote efficient injection of carriers into the polarization rotator once voltage is applied to it.

Polarization rotator 400 may include contacts 412, 414, 416. In the illustrated embodiment, polarization rotator 400 includes a first contact 412 on second doped layer 410, a second contact 414 adjacent to a first side of the heterostructure 408 (on the left side of the heterostructure 408 in FIG. 4), and a third contact 416 adjacent a second side of heterostructure 408 (on the right side of heterostructure 408 in FIG. 4). While all three contacts 412, 414, 416 are illustrated in the embodiment of FIG. 4, contacts 414 and 416 may perform a similar function. In alternate embodiments, either one of contacts 414 and 416 may be present, rather than both. These contacts 412, 414, 416 may comprise a ferromagnetic metals such as iron, cobalt, nickel, or another conductive material.

In operation, light may travel through polarization rotator 400 along the z-axis. Layers 406, 408 and 410 form a vertical structure extending perpendicular from ferromagnetic semiconductor layer 204. This vertical structure (e.g., rib waveguide) may cause the light to be guided in the direction of its propagation. This vertical structure may also make the polarization rotator compatible with other waveguides formed in substrate layer 402. A voltage may be applied between first and second contacts 412, 414 and/or between first and third contacts 412, 416. For example, in an embodiment, a voltage between about 0.5 volts and about 5 volts may be applied between the first and second contacts 412, 414 and between first and third contacts 412, 416. This may cause injection of spin-polarized carriers, which may then rotate the polarization of the light. By varying the amount of voltage applied, the amount of polarization rotation may be varied.

In more detail, polarization rotator 400 may exploit the interaction of light with spin-polarized electrons in a semiconductor material. One method of creating spin polarized electrons is through injecting carriers from a contact made out of a ferromagnetic material into the semiconductor material. The states of electrons in the conduction band may have the quantum states with spin=+or−½. In the valence band it may happen that quantum states for heavy holes (spin=+or−$\frac{3}{2}$) have lower energy than light holes (spin=½). Therefore the heavy-hole states may be populated rather than the light-hole states. In the presence of a magnetic field the degeneracy relative to +or − value of the spin may be lifted, resulting in a splitting of the corresponding energies: heavy holes spin=−$\frac{3}{2}$ are split from spin=+$\frac{3}{2}$, light holes=−½, are split from spin=+½. Due to the quantum mechanical selection rule $\Delta m=+/-1$ (conservation of angular momentum), only the electron −½ to hole −$\frac{3}{2}$ transition driven by right circularly polarized light (RCP) or the electron +½ to hole +$\frac{3}{2}$ transition driven by left circularly polarized light (LCP) may be allowed. When spin polarized carriers are injected into such a system, the + and − spin states may exhibit different populations. Therefore, LCP and RCP light may experience different indices of refraction. When linearly polarized light (a combination of RCP and LCP) interacts with such a system, its polarization may rotate. This phenomenon is typically called the Faraday Effect.

In one embodiment, first contact 412 may be a ferromagnetic contact that injects spin polarized electrons. One or more of second and third contacts 414, 416 may be attached to ferromagnetic semiconductor layer 404, within which the carriers may be holes. A magnetic field may be applied along the waveguiding direction (the z-axis) to maintain the magnetization direction of the ferromagnetic semiconductor 404. Subjected to the correct direction of magnetization, holes with spin primarily +$\frac{3}{2}$ may be injected into the heterostructure 408. This may ensure the different indices of refraction for LCP and RCP as per the paragraph above.

Polarization rotator 400 may be fabricated using the following materials and techniques. In one embodiment, substrate layer 402 may be a silicon on insulator (SOI) substrate layer 402 as illustrated, although in other embodiments, substrate layer 402 may be of a different type. Substrate layer 402 may include a handling layer, an insulator layer on the handling layer, and a device layer on the insulator layer. In one embodiment, the handling layer may comprise silicon, the insulator layer may comprise silicon dioxide, and the device layer may comprise silicon. In other embodiments, substrate layer 402 may be a different type of buried insulator substrate compatible with the materials to be used in the layers on top of substrate layer 402. For example, in the second embodiment described above, substrate layer 402 may be gallium arsenide based. In yet other embodiments, other materials may be used, and substrate layer 402 may be of a type that lacks a buried insulator layer, such as a single layer of semiconductor material.

In some embodiments, ferromagnetic semiconductor layer 404 may comprise manganese, silicon, and germanium, or manganese, gallium, and arsenic, although in other embodiments other materials may be used. In one embodiment, ferromagnetic semiconductor layer 404 may comprise $Mn_{0.05}Ga_{0.95}As$. In another embodiment, the ferromagnetic semiconductor layer 404 may comprise $Mn_{0.05}Si_{0.1}Ge_{0.75}$. In an embodiment, ferromagnetic semiconductor layer 404 is formed on substrate layer 402 by an atomic layer epitaxy process. In some embodiments, this process is performed at a low temperature, such as about 400 degrees Celsius, although other temperatures may be used. In some embodiments, ferromagnetic semiconductor layer 404 may have a thickness between about 50 nanometers and about 300 nanometers. In one embodiment, ferromagnetic semiconductor layer 404 may have a thickness between about 50 nanometers and about 150 nanometers. In other embodiments, ferromagnetic semiconductor layer 404 may have a different thickness.

In some embodiments, first doped layer 406 may have a doping type based on the conductivity type of ferromagnetic semiconductor layer 404. In an embodiment where ferromagnetic semiconductor layer 404 comprises MnSiGe, first doped layer 406 may comprise SiGe. In such an embodiment, first doped layer 406 may have p-type doping based on the p-type conductivity type of the MnSiGe ferromagnetic semiconductor layer 404. Similarly, in an embodiment where ferromagnetic semiconductor layer 404 comprises MnGaAs, first doped layer 406 may comprise AlGaAs, with p-type doping. In other embodiments, first doped layer 406 may comprise different materials and be doped differently. In some embodiments, first doped layer 406 may have a thickness between about 50 nanometers and about 300 nanometers. In an embodiment, first doped layer 406 may have a thickness between about 50 nanometers and about 150 nanometers. In an embodiment, first doped layer 406 may have a thickness between about 50 nanometers and about 100 nanometers. In other embodiments, first doped layer 406 may have a different thickness.

As discussed above, heterostructure 408 may comprise a plurality of alternating thin layers of materials: a layer comprising a first material or set of materials alternating with a layer comprising a second material or set of materials. A first layer type comprising a first material or set of materials alternates with a second layer type comprising a second material or set of materials. In one embodiment, each instance of the first layer type is substantially the same as the other instances of the first layer type. Similarly, in one embodiment, each instance of the second layer type may be substantially the same as the other instances of the second layer type. Heterostructure 408 may have as few as two layers, one of the first layer type and one of the second layer type, or may have twenty to fifty layers, or even more.

In one embodiment, each layer in heterostructure 408 may be thin. In one embodiment, each layer may have a thickness on the order of about 1 nanometer. In some embodiments, the layers may have thicknesses between about 0.5 nanometers and about 3 nanometers, although other thicknesses may be used. Thus, in an embodiment that includes about twenty-five of each of the types of layers, heterostructure 408 may have a thickness of about 50 nanometers to about 100 nanometers, although heterostructures 408 in other embodiments may have different thicknesses, based on the number of layers and thickness of each layer.

In one embodiment, the first layer type may comprise silicon and germanium and the second layer type may comprise silicon. In another embodiment, the first layer type may comprise gallium and arsenic and the second layer type may comprise aluminum, oxygen, gallium, and arsenic. In other embodiments, the first and second layer types may comprise other materials.

In some embodiments, second doped layer 410 may have a doping type opposite to that of the first doped layer 406. For example, in an embodiment where first doped layer 406 is p-doped, second doped layer 410 may be n-doped. In some embodiments, second doped layer 410 may have a thickness between about 50 nanometers and about 300 nanometers. In an embodiment, second doped layer 410 may have a thickness between about 50 nanometers and about 150 nanometers. In an embodiment, second doped layer 410 may have a thickness between about 50 nanometers and about 100 nanometers. In other embodiments, second doped layer 410 may have a different thickness.

In an embodiment where the ferromagnetic semiconductor layer 404 comprises MnSiGe and first doped layer 406 comprises SiGe, second doped layer 410 may comprise silicon with n-type doping. Similarly, in an embodiment where the ferromagnetic semiconductor layer 404 comprises MnGaAs and first doped layer 406 comprises AlGaAs, the second doped layer 410 may comprise aluminum, gallium and arsenic, with n-type doping. In one embodiment, second doped layer 410 may comprise $Al_{0.3}Ga_{0.7}As$. In another embodiment second doped layer 410 may comprise $Si_{0.6}Ge_{0.4}$. In yet another embodiment, second doped layer 410 may be doped with phosphorus. In other embodiments, second doped layer 410 may comprise different materials and be doped differently.

As described above, in the illustrated embodiment, polarization rotator 400 includes first contact 412 on second doped layer 410, second contact 414 adjacent to a first side of heterostructure 408 (on the left side of heterostructure 408 in FIG. 4), and third contact 416 adjacent a second side of heterostructure 408 (on the right side of the heterostructure 208 in FIG. 4). In other embodiments, there may be a different number of contacts, and the contacts may be positioned differently. In some embodiments, the width of layers 406, 408 and 410 may be different to define a different distribution of light intensity in the waveguide mode. Contacts 412, 414, 416 may comprise a conductive material such as iron, cobalt, nickel, or another conductive material.

In one embodiment, other devices and/or structures may also be formed on substrate layer 402. For example, one or more waveguides may be formed on substrate layer 402. In another embodiment, a die, such as a microprocessor may be formed by making devices and/or structures on substrate layer 402. Such a die may have a number of interconnect layers that include layers of dielectric material, layers of traces, and vias through the dielectric material. As the dielectric layers, traces, and vias are formed over the devices and/or structures that form the microprocessor, one or more layers of dielectric material may also be formed on polarization rotator 400. Conductive vias connecting to contacts 412, 414, 416 may be formed through the dielectric material to allow a voltage to be applied across the contacts 412, 414, 416. Thus, polarization rotator 400 may be integrated on a single substrate with one or more waveguides, passive and/or active devices (including those that form a microprocessor or other microelectronic device on substrate layer 402), or other structures.

Figure 5:
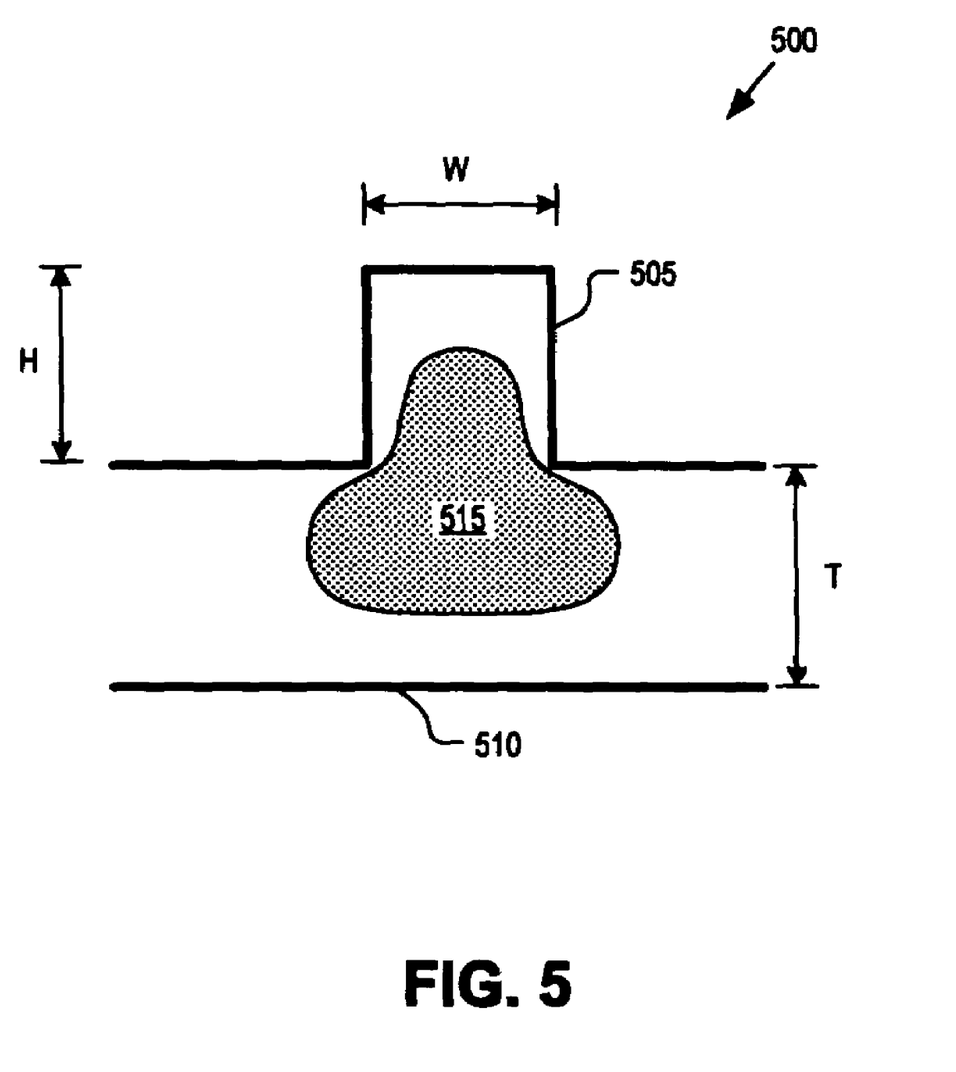
FIG. 5 is a schematic diagram illustrating an elevation view of a birefringent waveguide configured as a reciprocal rotator, in accordance with an embodiment of the invention.

FIG. 5 is a schematic diagram illustrating an elevation view of a birefringent waveguide 500 configured as a reciprocal rotator, in accordance with an embodiment of the invention. Birefringent waveguide 500 is one possible embodiment of reciprocal rotator 115 in FIG. 1. Birefringent waveguide 500 is a rib waveguide having a rib section 505 and a slab section 510. In one embodiment, birefringent waveguide 500 is fabricated of silicon formed over a silicon dioxide layer (silicon-over-insulator layer). The dimensions width W and height H may be selected such that birefringent waveguide 500 exhibits geometric anisotropy behavior. As such, a mode of the electromagnetic ("EM") field 515 propagating along birefringent waveguide 500 will experience different effective indexes of refraction in cases of the horizontal and vertical planes of polarization. These orientation dependent refractive indexes cause a reciprocal rotation in the linear polarization of EM field 515. In one embodiment, width W is 2 µm, height H is 0.3 µm, and a thickness T of slab section 510 is 1.2 µm.

Figure 6:
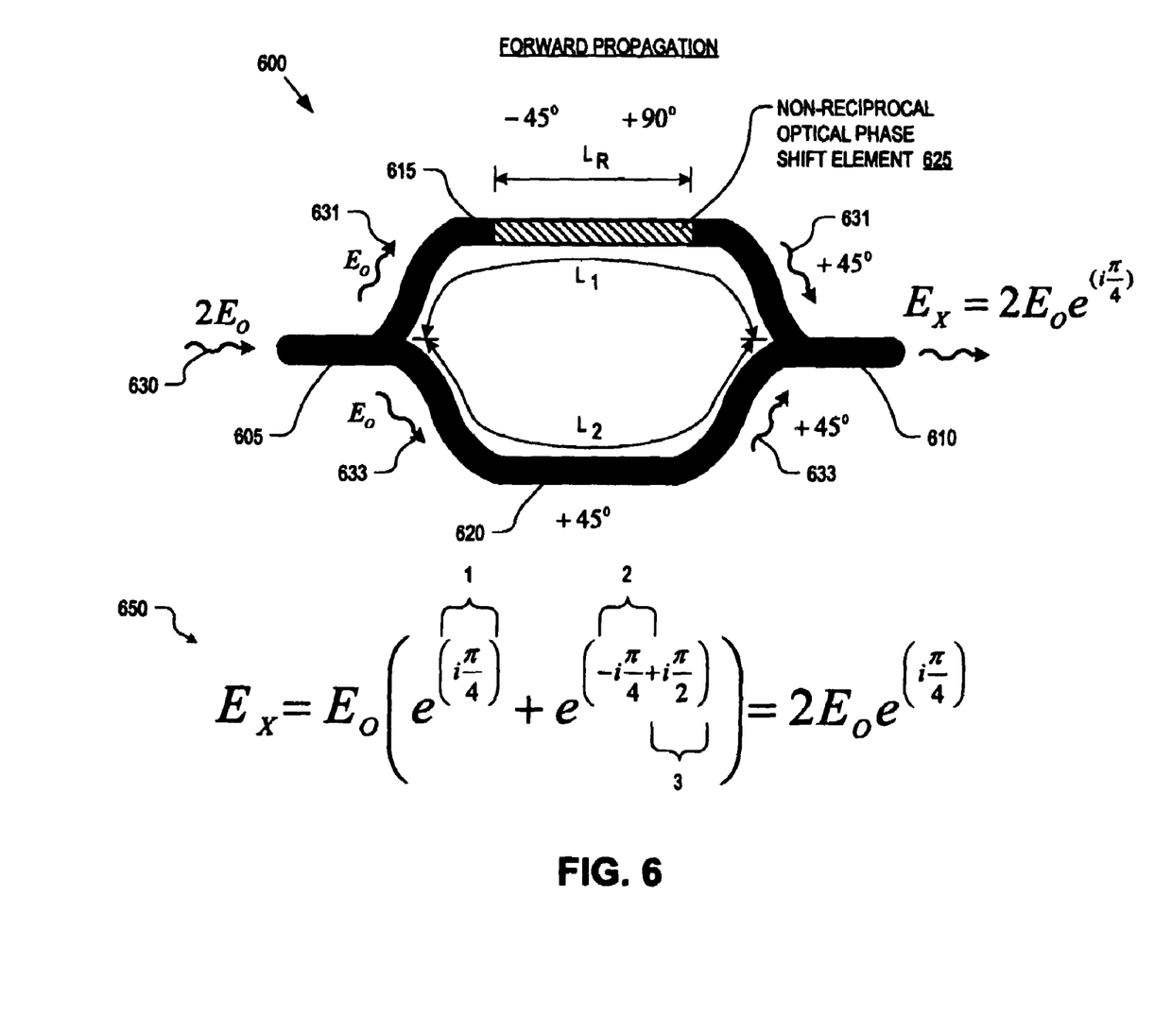
FIG. 6 is a schematic diagram illustrating a plan view of an optical isolator, in accordance with an embodiment of the invention.

FIG. 6 is a schematic diagram illustrating a plan view of an optical isolator 600, in accordance with an embodiment of the invention. The illustrated embodiment of optical isolator 600 includes optical splitter-combiners 605 and 610, waveguide sections 615 and 620, and a non-reciprocal optical phase shift element 625 (hereinafter non-reciprocal element 625). In the illustrated embodiment, optical splitter-combiners 605 and 610 are Y-branch waveguides; however, other optical splitting/combining elements may be substituted including evanescent couplers, beam splitters, and the like.

The components of optical isolator 600 are coupled together in a Mach-Zehnder interferometer ("MZI") configuration. Waveguide sections 615 and 620 each induce a reciprocal optical phase shift in forward/reverse propagating waves while non-reciprocal element 625 induces a non-reciprocal optical phase shift in forward/reverse propagating waves. Adding the various optical phase shifts induced by the components of optical isolator 600 together, results in constructive interference in the forward propagation direction, and allows a forward propagating wave 630 to pass through optical isolator 600. However, adding the various optical phase shifts imparted to a reverse propagating wave 730 (see FIG. 7) results in destructive interference and prevents backward propagating wave 730 from passing through optical isolator 600.

As illustrated, waveguide section 615 has a length L1 while waveguide section 620 has a length L2. In the illustrated embodiment, L2 is greater than L1 by a length ΔL, where ΔL is given by:

$$\Delta L = L_2 - L_1 \quad \text{(Relation 2)}$$

-continued $$\Delta L = \frac{\lambda_{vac}}{4n_{eff}} \quad \text{(Relation 3)}$$

where $\lambda_{vac}$ is the wavelength of the forward/reverse propagating waves in a vacuum and $n_{eff}$ is the effective index of refraction of the waveguide mode in sections 615 and 620. By fabricating the difference in length ΔL between waveguide sections 615 and 620 to follow Relation 3, a reciprocal optical phase shift difference of π/2 or 90 degrees is induced between the two waveguide sections 615 and 620. Non-reciprocal element 625 is configured to induce an additional non-reciprocal optical phase shift of π/2 or 90 degrees only in waveguide section 615.

FIG. 6 illustrates propagation of forward propagating wave 630 through optical isolator 600. Forward propagating wave 630 is split into components 631 and 633, having substantially equal E-field magnitudes $E_O$, by optical splitter-combiner 605. Components 631 and 633 propagate through waveguide sections 615 and 620, respectively, resulting in a net optical phase shift of both components 631 and 633 of positive 45 degrees or π/4 radians. Components 631 and 633 are subsequently constructively recombined by optical splitter-combiner 610.

Equation 650 (see FIG. 6) describes the optical phase shifts induced by each section of optical isolator 600 to forward propagating wave 630. Term 1 corresponds to the phase shift induced by waveguide section 620 while terms 2 and 3 correspond to the phase shifts induced by waveguide section 615 and non-reciprocal element 625, respectively.

Figure 7:
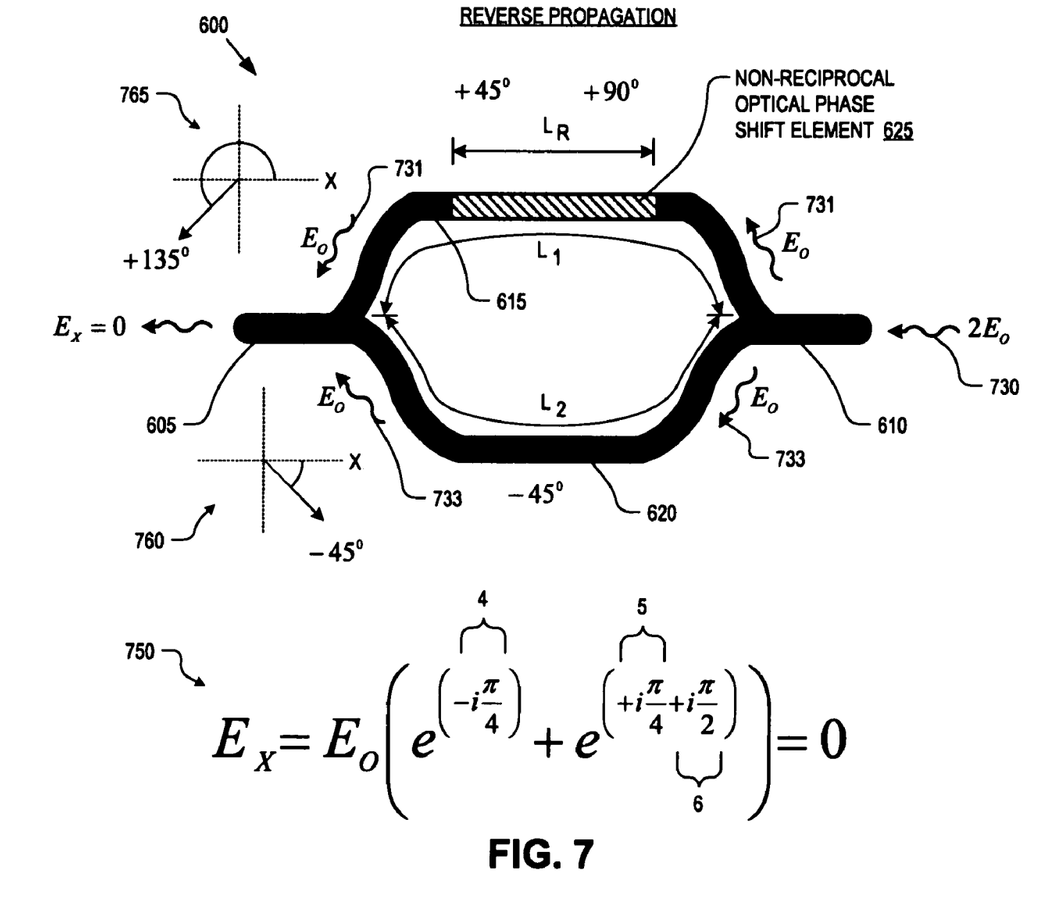
FIG. 7 is a schematic diagram illustrating a plan view of an optical isolator, in accordance with an embodiment of the invention.

FIG. 7 illustrates propagation of reverse propagating wave 730 through optical isolator 600. Reverse propagating wave 730 is split into components 731 and 733, having substantially equal E-field magnitudes $E_O$, by optical splitter-combiner 610. Components 731 and 730 propagate through waveguide sections 615 and 620, respectively. Waveguide section 620 induces a reciprocal optical phase shift of −45 degrees or −π/4 radians, as illustrated by phasor diagram 760. However, waveguide section 615 induces a +45 degree or +π/4 radians optical phase shift and non-reciprocal element 625 induces a +90 degree or +π/2 radians optical phase shift for a net optical phase shift of +135 degrees or +3π/4 radians, as illustrated by phasor diagram 765. Since components 731 and 733 are 180 degrees out of phase, optical splitter-combiner 605 destructively recombines components 731 and 733 for a net E-field of zero.

Equation 750 (see FIG. 7) describes the optical phase shifts induced by each section of optical isolator 600 to reverse propagating wave 730. Term 4 corresponds to the phase shift induced by waveguide section 620 while terms 5 and 6 correspond to the phase shifts induced by waveguide section 615 and non-reciprocal element 625, respectively.

As illustrated by phasor diagrams 760 and 765, components 731 and 733 have equal, but opposed Ex components projected onto the x-axis. Since most optical sources emit optical light having a linear Ex polarization, optical isolator 600 prevents substantially all reverse propagating waves from passing through the device. It should be appreciated that optical isolator 600 may be modified to block Ey reverse propagating waves, as is described below. Furthermore, two optical isolators 600 may be coupled in series to block both Ex and Ey reverse propagating waves, where one optical isolator is designed to block linear Ex polarized reverse propagating waves and the other is designed to block linear Ey polarized reverse propagating waves.

In one embodiment, optical splitter-combiners 605 and 610 and waveguide sections 615 and 620 are rib waveguides formed of silicon (or other optically transmissive material) monolithically integrated into a single silicon semiconductor die (or other semiconductor material die) along with non-reciprocal element 625. As in the case with optical isolator 100, optical isolator 600 is integratable with a variety of other photonic and electronic devices within a single semiconductor die.

Figure 8:
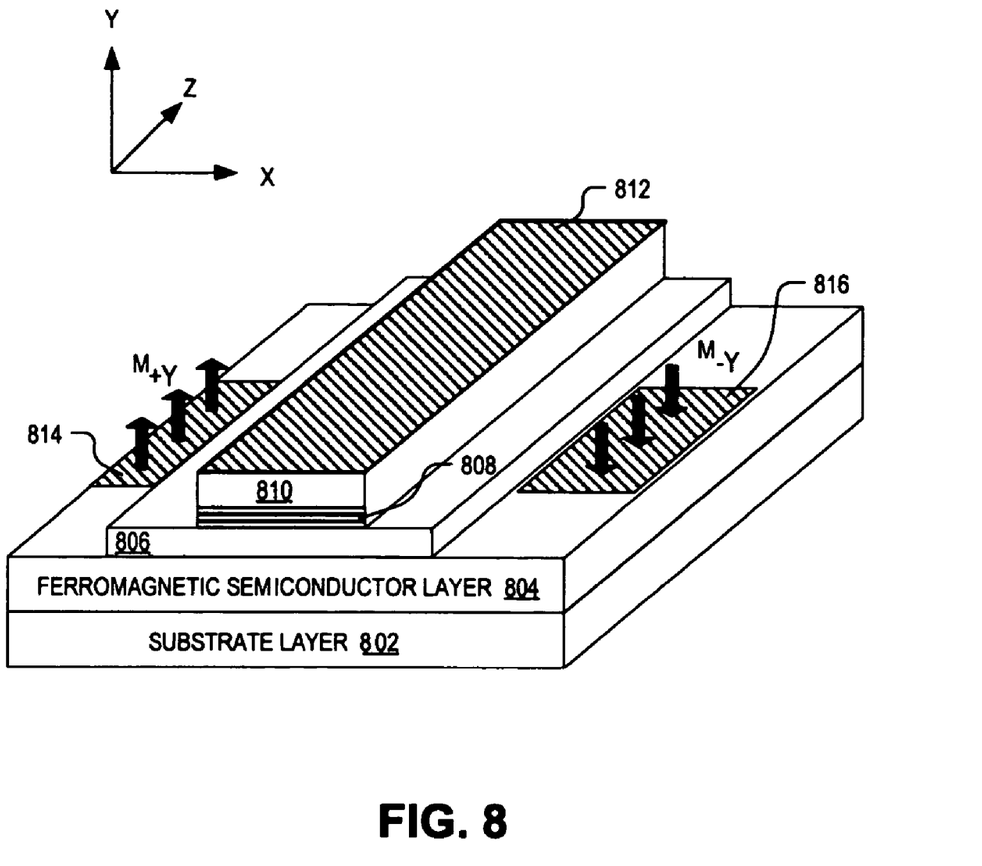
FIG. 8 illustrates a perspective view of a non-reciprocal optical phase shift element, in accordance with an embodiment of the invention.

FIG. 8 illustrates a perspective view of a non-reciprocal optical polarization phase shift element 800 (henceforth polarization phase shifter 800), in accordance with an embodiment of the invention. Polarization phase shifter 800 is one possible embodiment of non-reciprocal element 600. The illustrated embodiment of polarization phase shifter 800 includes a substrate layer 802, a ferromagnetic semiconductor layer 804, a first doped semiconductor layer 806, a heterostructure 808, a second doped layer 810, a contact 812, and magnetized contacts 814 and 816.

The structure of polarization shifter 800 is similar to the structure of polarization rotator 400 and may be manufactured using similar materials in a similar manner, with the following exceptions. Instead of having a uniform magnetization along the z-axis, magnetized contacts 814 and 816 are magnetized along the y-axis perpendicular to the direction of propagation through polarization phase shifter 800. In the illustrated embodiment, magnetized contact 814 is magnetized along the +y-axis while magnetized contact 816 is inversely magnetized along the −y-axis. When a voltage is applied between contact 812 and magnetized contacts 814 and 816, charge carriers are injected into the optical path passing through the rib waveguide like structure. Charge carriers injected into the side closes to magnetized contact 814 have spin polarizations aligned with the magnetic field $M_{+Y}$ generated by magnetic contact 814. Similarly, charge carrier injected into the side closes to magnetized contact 816 have spin polarizations aligned with the opposite magnetic field $M_{-Y}$ generated by magnetic contact 816.

In one embodiment, the spin polarized charge carriers are spin-polarized holes. With the left and right sides of the optical path through polarization phase shifter 800 populated with free carriers having opposite spin polarizations, the Faraday effect creates a non-reciprocal optical phase shift. A non-reciprocal optical phase shift is an induced phase shift having a consistent sign irrespective of the direction of propagation through the device or material. In other words, irrespective of whether an optical wave is propagating along the +z-axis or the −z-axis through polarization phase shifter 800, the phase shift will be either both positive or both negative. In contrast, a reciprocal phase shift is an induced shift which changes sign depending upon the direction of propagation through the device or material.

The inclusion of heterostructure 808 confines and concentrates the injected charge carriers within the optical path through polarization phase shifter 800. Such confinement increases the optical susceptibility of the material and increases the efficiency of the device. In one embodiment, polarization phase shifter 800 is approximately 100 μm in length along the z-axis to induce a non-reciprocal phase shift of 90 degrees.

Magnetized contacts 814 and 816 may be magnetized during fabrication using a multi step process. First, contacts 814 may be formed on ferromagnetic semiconductor layer 804 and magnetized by application of an external magnetic field along the +y-axis. Next, an anti-ferromagnetic layer may be disposed on top of magnetized contact 814. The intimate contact of a magnetized ferromagnetic layer with an anti-ferromagnetic layer results in a high energy barrier for resisting a change of magnetization of the ferromagnetic layer. The contact of a ferromagnetic layer with an anti-ferromagnetic layer is called "pinning". Subsequently, contact 816 may be formed on ferromagnetic semiconductor layer 804 and magnetized by application of an external magnetic field along the − y-axis. The anti-ferromagnetic layer disposed on magnetized contact 814 counteracts the external magnetic field applied during magnetization of contact 816, thereby safeguarding the opposite magnetization inured into magnetized contact 814.

The embodiment of polarization phase shifter 800 is configured to non-reciprocally phase shift Ex polarized waves. However, by rotating the structure of polarization phase shifter 800 by 90 degrees about the z-axis, polarization phase shifter 800 can be modified to phase shift Ey polarized waves.

Figure 9:
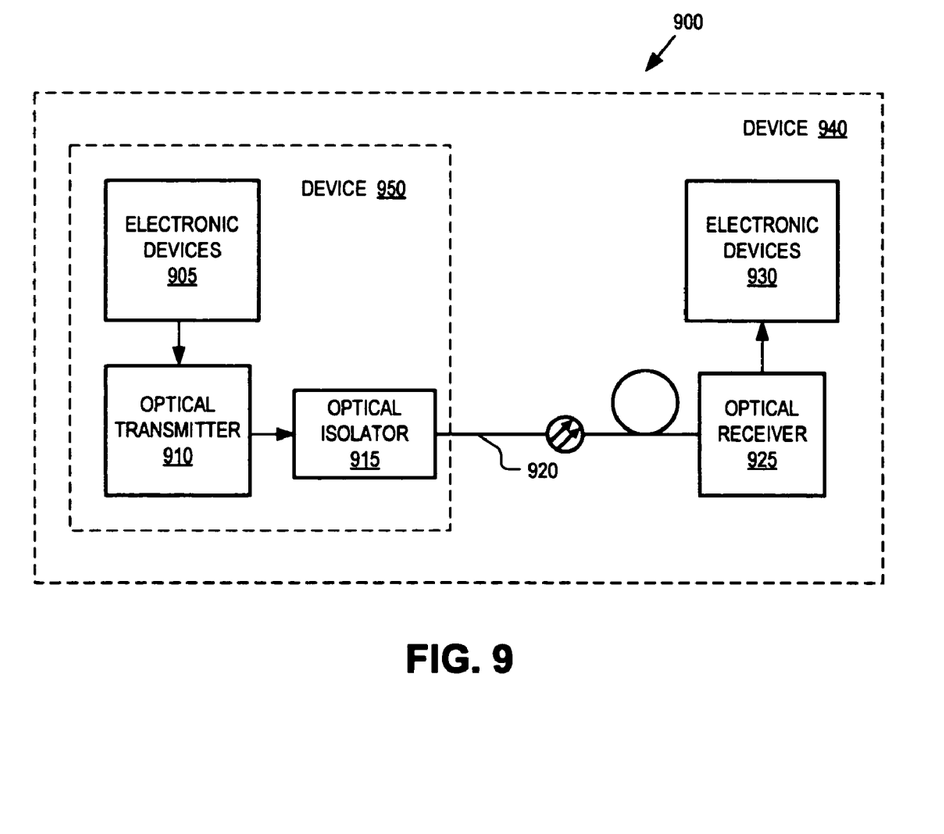
FIG. 9 is a functional block diagram illustrating a demonstrative optical communication system implemented with an integratable optical isolator, in accordance with an embodiment of the invention.

FIG. 9 is a functional block diagram illustrating a demonstrative optical communication system 900 implemented with an integratable optical isolator, in accordance with an embodiment of the invention. Optical communication system 900 includes transmitter side electronic devices 905, an optical transmitter 910, an optical isolator 915, a waveguide 920, an optical receiver 925, and receiver side electronic devices 930. Optical isolator 915 may be implemented with embodiments of optical isolator 100 or optical isolator 600, as described above.

Electronic devices 905 may include various processing components including a processor, memory, various logic units, and the like. During operation, electronic devices 905 may generate an electrical signal that is converted to an optical signal by optical transmitter 910, such as a laser. Optical transmitter 910 is coupled to optical isolator 915 such that the optical signal is sent through the optical isolator 915 to prevent back reflections from disturbing optical transmitter 910. The optical signal then propagates through waveguide 920 to optical receiver 925. Optical receiver 925 converts the optical signal back to an electrical signal, which is then provided to electronic devices 930.

The components of communication system 900 may all be included within a single device 940. For example, device 940 may be an integrated circuit having communication system 900 integrated into a single semiconductor die. Alternatively, device 940 may be a circuit board having the components of communication system 900 mounted thereon. In one embodiment, device 950 is a single semiconductor die having some or all of electronic devices 905, optical transmitter 910 and optical isolator 915 monolithically integrated therein. By integrating optical isolator 915 with electronic devices 905 and/or optical transmitter 910, the total size of device 950 may be significantly smaller and/or less expensive than possible with prior systems (although some embodiments may be larger than some prior systems, if desired). In one embodiment, waveguide 920 is an optical fiber linking optical isolator 915 to optical receiver 925.

The devices disclosed above may be embodied within a machine readable medium, containing a hardware descriptive language ("HDL") describing the integration of the various sub-components of optical isolators 100 and 600 with other circuit elements. For example, optical isolates 100 and 600 may be included within an application specific integrated circuit ("ASIC") or the like, described by an HDL such as Verilog, VHDL (VHSIC(Very High Speed Integrated Circuit) Hardware Descriptive Language), or other HDLs. The circuit description may be described at various levels of abstraction including the behavioral level, the register transfer level, the net list level, and/or the layout level.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An optical isolator, comprising:
   first and second optical splitter-combiners disposed within a semiconductor die;
   first and second waveguide sections disposed within the semiconductor die coupling the first and second optical splitter-combiners in an interferometer configuration; and
   a non-reciprocal optical phase shift element disposed within the semiconductor die, the first waveguide section passing through the non-reciprocal optical phase shift element, wherein a forward propagating wave is constructively recombined by the second optical splitter-combiner while a reverse propagating wave is destructively recombined by the first optical splitter-combiner, wherein the non-reciprocal optical phase shift element comprises:
   a first contact magnetized in a first direction disposed adjacent to a first side of the first waveguide section to polarize spins of first charge carriers injected into the first waveguide section; and
   a second contact magnetized in a second direction substantially opposite the first direction disposed adjacent to a second side of the first waveguide section to oppositely polarize spins of second charge carriers injected into the first waveguide section.

2. The optical isolator of claim 1, wherein the second waveguide section is longer than the first waveguide section by an amount equal to a multiple of λ/4n, where λ represents a wavelength of the forward and reverse propagating waves within a vacuum and n represents an effective index of refraction of the first and second waveguide sections.

3. The optical isolator of claim 1, wherein the first and second optical splitter-combiners comprise first and second Y-branch waveguides.

4. The optical isolator of claim 1, wherein the non-reciprocal optical phase shift element further comprises: a ferromagnetic semiconductor layer; a first doped layer disposed above the ferromagnetic semiconductor layer; a second doped layer disposed above the first doped layer; and a third contact disposed above the second doped layer, and wherein the first waveguide section passes through at least one of the first and second doped layers.

5. The optical isolator of claim 4, wherein the non-reciprocal optical phase shift element further includes a multi-layer heterostructure disposed between the first doped layer and the second doped layer to confine charge carriers.

6. The optical isolator of claim 1, wherein the first and second directions are substantially perpendicular to propagation directions of the forward and reverse propagating waves in an optical path through the non-reciprocal delay element.

7. A system, comprising:
- an optical source coupled to generate an optical signal responsive to an electronic processing device;
- an optical fiber; and
- an optical isolator coupled between the optical source and the optical fiber, the optical isolator including:
  - first and second optical splitter-combiners disposed within a semiconductor die;
  - first and second waveguide sections having different lengths disposed within the semiconductor die coupling the first and second optical splitter-combiners in an interferometer configuration; and
  - a non-reciprocal optical phase shift element disposed within the semiconductor die, the first waveguide section passing through the non-reciprocal optical phase shift element, wherein a forward propagating wave is constructively recombined by the second optical splitter-combiner while a reverse propagating wave is destructively recombined by the first optical splitter-combiner, wherein the non-reciprocal optical phase shift element comprises:
    - a first contact magnetized in a first direction disposed adjacent to a first side of the first waveguide section to polarize spins of first charge carriers injected into the first waveguide section; and
    - a second contact magnetized in a second direction substantially opposite the first direction disposed adjacent to a second side of the first waveguide section to oppositely polarize spins of second charge carriers injected into the first waveguide section.

8. The system of claim 7, wherein the first waveguide section is longer than the second waveguide section by an amount equal to $\lambda/4n$, where $\lambda$ represents a wavelength of the forward and reverse propagating waves within a vacuum and n represents an index of refraction of a material forming the first and second waveguide sections.

9. The system of claim 8, wherein the non-reciprocal optical phase shift element comprises:
- a ferromagnetic semiconductor layer;
- a first doped layer disposed above the ferromagnetic semiconductor layer;
- a second doped layer disposed above the first doped layer;
- a first contact disposed above the second doped layer;
- a second contact magnetized in a first direction disposed adjacent a first side of an optical path passing through the non-reciprocal optical phase shift element; and
- a third contact magnetized in a second direction opposite of the first direction disposed adjacent a second side of the optical path.

10. The system of claim 9, wherein the first and second directions are substantially perpendicular to propagation directions of the forward and reverse propagating waves in the optical path through the non-reciprocal delay element.

11. The system of claim 10, wherein the second and third contacts are each magnetized to oppositely polarize spins of charge carries injected into the optical path between the first and second doped layers.

12. The system of claim 7, wherein the optical isolator, the optical source, and the electronic processing device are integrated into the same semiconductor die.

* * * * *